United States Patent [19]

Kinoshita et al.

[11] Patent Number: 5,850,176
[45] Date of Patent: Dec. 15, 1998

[54] DRIVE ASSIST SYSTEM FOR VEHICLE

[75] Inventors: Masahiro Kinoshita, Ota; Atsushi Ikeda, Ashikaga, both of Japan

[73] Assignee: Fuji Jukogyo Kabushiki Kaisha, Tokyo, Japan

[21] Appl. No.: 878,550

[22] Filed: Jun. 19, 1997

[30] Foreign Application Priority Data

Jul. 10, 1996 [JP] Japan ................................. 8-180677

[51] Int. Cl.⁶ .................................................. B60Q 1/00
[52] U.S. Cl. ........................ 340/435; 340/436; 340/903; 340/904; 701/48; 701/70; 701/96
[58] Field of Search .................................. 340/903, 904, 340/934, 435, 436; 701/45, 48, 70, 71, 78, 79, 96, 301

[56] References Cited

U.S. PATENT DOCUMENTS 5,670,953  9/1997  Satoh et al. .......................... 340/903

Primary Examiner—Jeffery A. Hofsass
Assistant Examiner—Daryl C. Pope
Attorney, Agent, or Firm—Beveridge, DeGrandi, Weilacher & Young, LLP

[57] ABSTRACT

In a vehicular drive assist system for warning a driver to pay attention to a preceding vehicle running ahead when a vehicle comes close to the preceding vehicle and the distance between these two vehicles becomes smaller than a safe inter-vehicle distance, this safe inter-vehicle distance is automatically established in two stages according to traffic conditions. One stage is where road is empty and another is where road is crowded. Since the safe inter-vehicle distance at the crowded condition is established to be a smaller value than the one at the empty condition, when road is crowded, due to the shortened safe inter-vehicle distance, warning is prevented from being issued so frequently.

11 Claims, 4 Drawing Sheets

DRIVE ASSIST SYSTEM FOR VEHICLE

BACKGROUND OF THE INVENTION

1. Field of the Invention

The present invention is directed to a drive assist system for a vehicle and more particularly to a drive assist system capable of assisting a driver's operation of the vehicle so as to maintain a proper distance between vehicles running in the same direction.

2. Prior Art

With an increase of the number of motor vehicles, frequent occurrence of traffic jams has also increased. In particular, such traffic jams very usually occur on the roads and highways in large cities and towns therearound. When a driver encounters traffic jams, he has to continue to pay attention to a distance between his own car and a car running ahead so as to avoid collision with that preceding car. He has to frequently step on the brake pedal and the accelerator pedal in such traffic jams. This leads to a driver's stress and wearing which may induce a collision with the vehicle running ahead. Generally, it is difficult to maintain a proper distance between two cars especially in such a condition where his own car or other vehicles are changing speeds.

In order to save the driver from such stress or wearing, recently various approaches for safe driving have been attempted. One of these approaches is the development of an ADA (Active Drive Assist System) for positively assisting the driver's operation of the vehicle under various traffic conditions. The ADA is a system which gives warnings to drivers, avoidance operations and the like when danger is imminent by estimating various possibilities of such a collision with the preceding vehicle, a contact with an obstacle, running off lanes and other troubles from surrounding information and running conditions of his own vehicle. As an apparatus for collecting surrounding information, there is a known technique using a laser-beam radar. Recently, an ADA system employing cameras mounted on the vehicle has been developed. The ADA system is for recognizing road and traffic conditions as three-dimensional information with practically adequate accuracy by processing image information of the frontal scenery or objects taken by a plurality of cameras installed on the vehicle.

It is a most important function of the ADA to assist the vehicle driver so as to maintain a proper distance (hereinafter, referred to as an "inter-vehicle distance") between his vehicle and a preceding vehicle and to avoid a collision with the preceding vehicle. As an example of this kind of technology, Journal of The Society of Automotive Engineers of Japan Vol. 43, No. 2, 1989, an article "Rear-end Collision Warning System using Laser-beam for Heavy-duty Trucks" discloses a technology in which a vehicle speed of the preceding vehicle and a relative vehicle speed of the subject vehicle with respect to the preceding vehicle are calculated based on a vehicle speed of the subject vehicle and a distance between the subject vehicle and the preceding vehicle detected by a laser beam-radar apparatus, and when the distance between the two vehicles comes within a safe inter-vehicle distance calculated based on this relative vehicle speed, an alarm is sent out to a vehicle driver with two steps; a first step of the alarm is to warn the vehicle driver so as to make adjustment of the inter-vehicle distance and a second step of the alarm is to warn so as to apply brakes or turn the steering wheel.

The issuance timing of the first step alarm can be varied manually according to traffic conditions, driver's driving habits and the like.

However, this variable timing is rather troublesome when traffic conditions frequently change and the timing tends to be established at the position where the alarm is refrained, with the issuance of the alarm eventually being alienated.

SUMMARY OF THE INVENTION

In view of the foregoing shortcoming, it is an object of the present invention to provide a vehicular drive assist system capable of automatically establishing a proper timing for the issuance of an alarm according to traffic conditions without a driver's operation of the drive assist system.

The drive assist system comprises inter-vehicle distance calculating means for detecting a preceding vehicle running ahead of a subject vehicle and for calculating an inter-vehicle distance between the vehicle and the preceding vehicle, vehicle speed calculating means for calculating a vehicle speed of the subject vehicle, preceding vehicle speed calculating means for calculating a vehicle speed of the preceding vehicle based on the inter-vehicle distance and the vehicle speed of the subject vehicle and collision preventing means for preventing a collision of the subject vehicle with the preceding vehicle, traffic conditions judging means for judging a present traffic condition, safe inter-vehicle distance establishing means for establishing a safe inter-vehicle distance according to the traffic condition, inter-vehicle distance comparing means for comparing the inter-vehicle distance with the safe inter-vehicle distance and for outputting a signal when the inter-vehicle distance becomes smaller than the safe inter-vehicle distance; and operating signal outputting means for outputting an operation signal to the collision preventing means based on the signal.

DETAILED DESCRIPTION OF PREFERRED EMBODIMENTS

Figure 2:
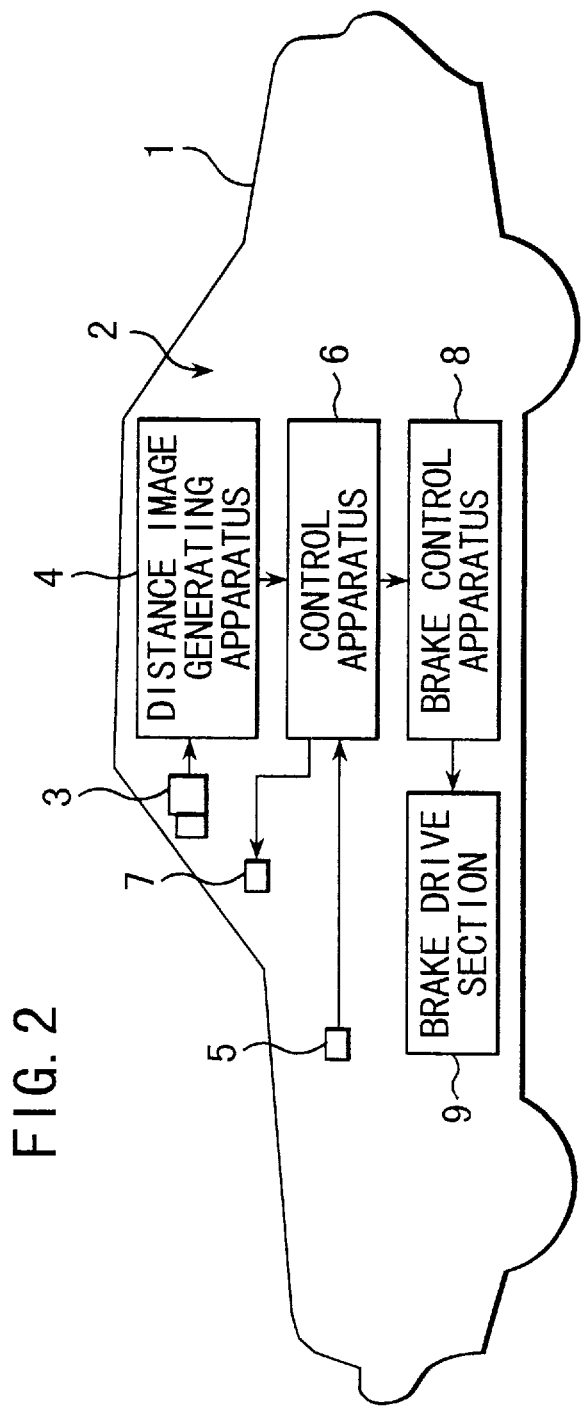
FIG. 2 is a schematic view of a vehicular drive assist system according to the present invention.

Referring now to FIG. 2, numeral 1 denotes a vehicle on which a drive assist system 2 having a collision preventing function is mounted. In this embodiment, only this collision preventing function of the drive assist system 2 will be described and therefore description of other functions which might be involved in this system will be omitted.

The drive assist system 2 comprises a stereoscopic optical system 3 for imaging picture images in the vehicle running direction, a distance image generating apparatus 4 for generating distance images, a vehicle speed sensor 5 for detecting a vehicle speed $V_2$ of the vehicle 1, a control apparatus 6 for processing the distance images and the vehicle speed $V_2$, and for outputting a signal to a buzzer 7 and a brake control apparatus 8 for the collision preventing purpose.

The stereoscopic optical system 3 is composed of a pair of left and right CCD cameras mounted with a specified interval at the front ceiling of the passenger compartment.

The distance image generating apparatus 4 is mainly composed of an image processor in which distance images presenting a three-dimensional distance distribution are formed over an entire image of a pair of stereoscopic pictures taken by the stereoscopic optical system 3 according to a principle of triangulation and is outputted to the control apparatus 6.

The control unit 6 is constituted by a microprocessor, in which the distance images sent from the distance image generating apparatus 4 are processed and information as needed is formed. In the control apparatus 6, the collision preventing control which will be described hereinafter is performed based on that information and the vehicle speed $V_2$ detected by the vehicle speed sensor 5, and the control signal is outputted to the buzzer 7 and the brake control apparatus 8, respectively.

The brake control apparatus 8 is connected with a brake drive section 9 constituted by a hydraulic unit including a hydraulic pressure source, a pressure reducing valve, a pressure increasing valve and the like. Brake pressure is supplied from the brake drive section 9 to the wheel cylinders (not shown) according to input signals from the brake control apparatus 8.

Figure 1:
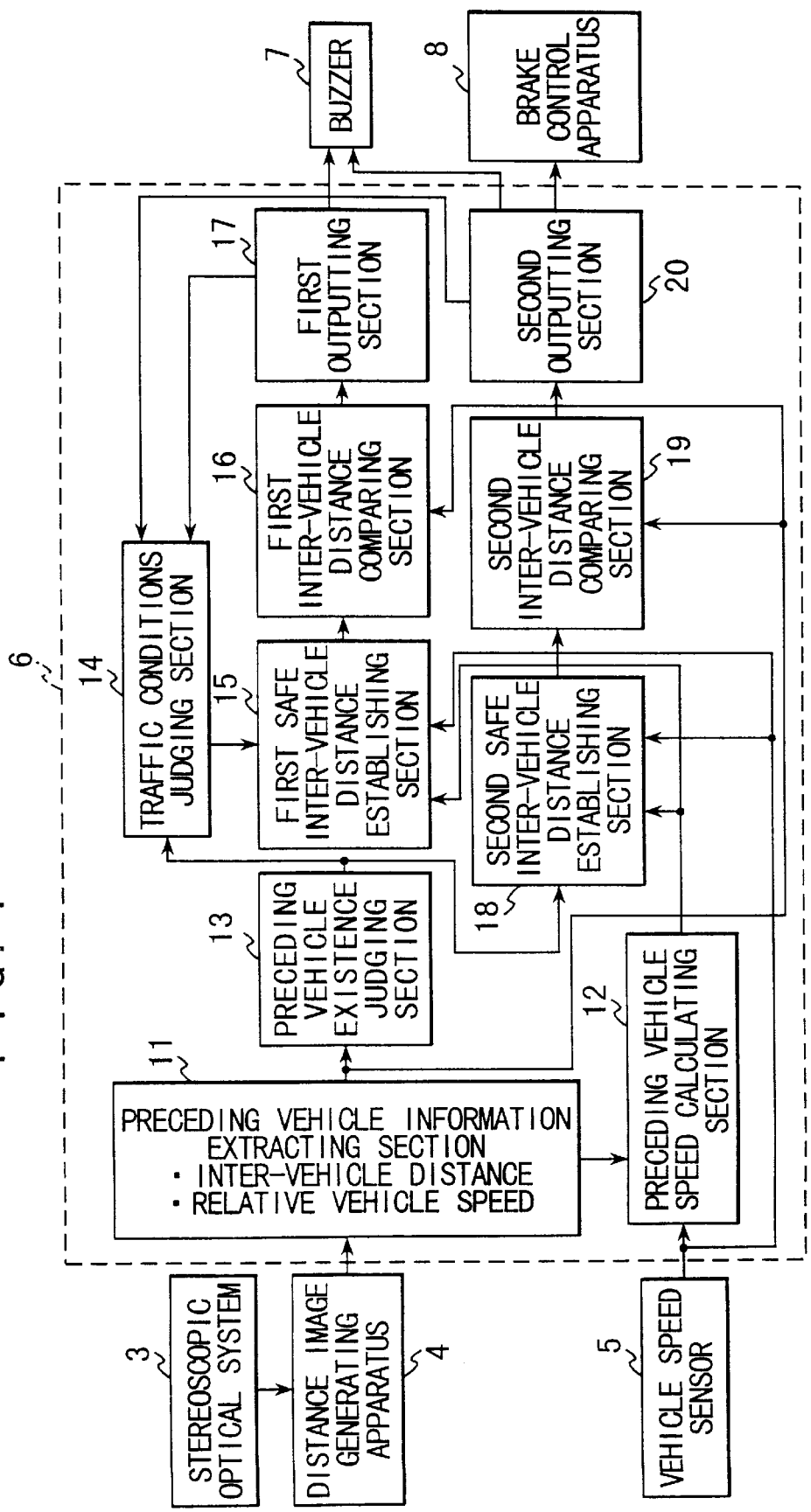
FIG. 1 is a block diagram of a vehicular drive assist system according to the present invention.

As shown in FIG. 1, the control apparatus 6 comprises a preceding vehicle information extracting section 11, a preceding vehicle speed calculating section 12, a preceding vehicle existence judging section 13, a traffic conditions judging section 14, a first safe inter-vehicle distance establishing section 15, a first inter-vehicle distance comparing section 16, a first outputting section 17, a second safe inter-vehicle distance establishing section 18, a second inter-vehicle distance comparing section 19 and a second outputting section 20.

The preceding vehicle information extracting section 11 functioning as an inter-vehicle calculating means preforms image processings such as extracting a feature of a box-like object from distance image information inputted from the distance image generating apparatus 4 to identify a preceding vehicle from among objects in the picture images and outputs a distance is between the subject vehicle and the preceding vehicle to the preceding vehicle existence judging section 13, the first inter-vehicle distance comparing section 16 and the second inter-vehicle distance comparing section 19, respectively. In a case where a preceding vehicle does not exist within a detectable range, the inter-vehicle distance is established to be a large value such as 999 m, and that value is outputted. Further, in the preceding vehicle information extracting section 11, a relative vehicle speed between the two vehicles is calculated based on the change of the inter-vehicle distance $L_s$ versus time and outputted to the preceding vehicle speed calculating section 12.

In the preceding vehicle speed calculating section 12, a vehicle speed $V_1$ of the preceding vehicle is calculated based on the relative vehicle speed from the preceding vehicle information extracting section 11 and the vehicle speed $V_2$ detected by the vehicle speed sensor 5 of the subject vehicle and outputted to the first safe inter-vehicle distance establishing section 15 and the second safe inter-vehicle distance establishing section 18, respectively.

In the preceding vehicle existence judging section 13, it is judged whether or not a preceding vehicle exists based on the value of the inter-vehicle distance $L_s$ derived from the preceding vehicle information extracting section 11 and the result of the judgment is outputted to the traffic conditions judging section 14 and the second safe inter-vehicle distance establishing section 18, respectively.

In the traffic conditions judging section 14 acting as a traffic conditions judging means, it is judged whether the traffic condition is a crowded condition or an empty (not crowded) condition and the result of the judgment is outputted to the first safe inter-vehicle distance establishing section 15. The crowded condition is defined as a period during which the preceding vehicle exists within a predetermined range of distance $L_0$ after the buzzer 7 is operated by a signal from the first outputting section 17 or after both the buzzer 7 and the brake control apparatus 8 are operated by a signal from the second outputting section 20, or a period during which the preceding vehicle is out of the predetermined range of distance $L_0$ but within a specified time $t_j$ after the buzzer 7 or both the buzzer 7 and the brake control apparatus 8 are operated. All other conditions are defined as an empty condition.

In the first safe inter-vehicle distance establishing section 15 formed as a safe inter-vehicle distance establishing means, based on the result the judgment (crowded condition or empty condition) in the traffic conditions judging section 14, a first safe inter-vehicle distance $L_{C1}$ which is a reference value for generating a first assist output is calculated and outputted to the first inter-vehicle distance comparing section 16. Here, the first assist output is an output for warning a vehicle driver to pay attention to the preceding vehicle. The first safe inter-vehicle distance $L_{11}$ in the empty condition is calculated as follows:

$$L_{11} = V_1^2/(2.0 \times \alpha_{11}) - V_2^2/(2.0 \times \alpha_2) + T_\alpha \times V_2 + L_\alpha \quad (1)$$

where $\alpha_{11}$ is a specified deceleration value of the preceding vehicle; $\alpha_2$ is a specified deceleration value of the subject vehicle; $T_\alpha$ is a delay time of operation of the subject vehicle and $L_\alpha$ is a leeway distance after stop. Generally, $\alpha_{11}$ is established to be 0.3 G for example.

The term $V_1^2/(2.0 \times \alpha_{11})$ expresses a stopping distance of the preceding vehicle, the term $V_2^2/(2.0 \times \alpha_2)$ expresses a stopping distance of the subject vehicle and the term $T_\alpha \times V_2$ expresses a dead running distance.

The first safe inter-vehicle distance $L_{12}$ in the crowded condition is calculated according to the following formula:

$$L_{12} = V_1^2/(2.0 \times \alpha_{11}) - V_2^2/(2.0 \times \alpha_2) + (T_\alpha - T_\beta) \times V_2 + L_\alpha \quad (2)$$

where $T_\beta (T_\beta < T_\alpha)$ is a time which has been determined beforehand through experiments and the like so as to adjust the delay time of $T_\alpha$ in consideration of driver's raised power of attention due to the closer inter-vehicle distance than normally.

Because of this, the first safe inter-vehicle distance $L_{12}$ in the crowded condition is established to be shorter than the first safe inter-vehicle distance $L_{11}$ in the empty condition.

Thus, in the first safe inter-vehicle distance establishing section 15, since an appropriate first safe inter-vehicle distance $L_{C1}$ is established automatically according to traffic conditions, it is not necessary for the vehicle driver to do a changeover operation every time the traffic condition varies.

In the first inter-vehicle comparing section 16 forming an inter-vehicle distance comparing means, the first safe inter-vehicle distance $L_{C1}$ (in the actual control, $L_{S1}$ is either $L_{11}$ or $L_{12}$) established by the first safe inter-vehicle establishing section 15 is compared with the present inter-vehicle distance $L_S$ and when the present inter-vehicle distance $L_S$ becomes smaller than the first safe inter-vehicle distance $L_{C1}$, a signal is outputted to the first outputting section 17.

In the first outputting section 17 forming an operational signal outputting means, based on the signal from the first inter-vehicle comparing section 16, a signal is outputted to the buzzer 7 so as to operate the buzzer 7 and to the traffic conditions judging section 14, respectively.

In the second safe inter-vehicle distance establishing section 18, a safe inter-vehicle distance (second safe inter-vehicle distance $L_{C2}$) is calculated and outputted to the second inter-vehicle distance comparing section 19. This second safe inter-vehicle distance $L_{C2}$ is employed as a reference value for generating a second assist output so as to urge the driver to take action for preventing a collision with the preceding vehicle and at the same time to apply the brakes. The second safe inter-vehicle distance $L_2$ set in $L_{C2}$ is calculated according to the following formula:

$$L_2 = V_1^2/(2.0 \times \alpha_{12}) - V_2^2/(2.0 \times \alpha_2) + T_\alpha \times V_2 + L_\alpha \qquad (3)$$

Figure 4:
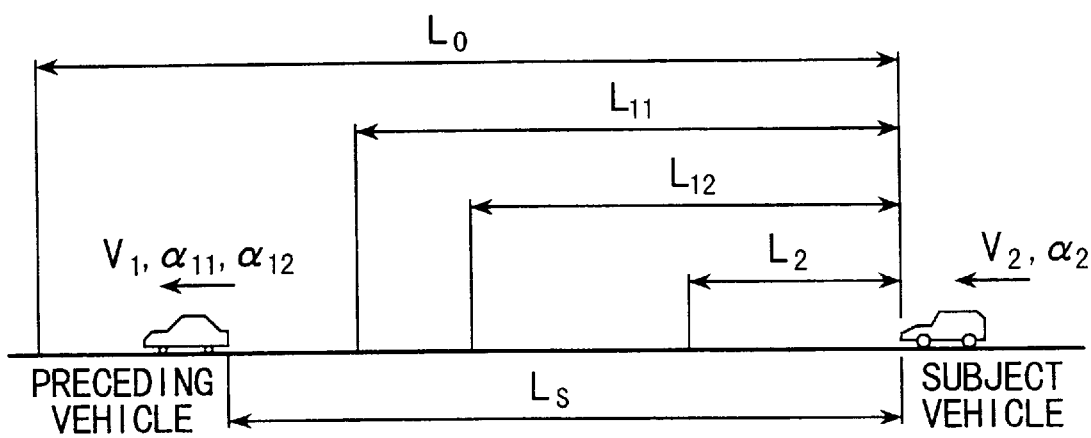
FIG. 4 is a view for explaining a safe inter-vehicle distance.

In the formula (3), $\alpha_{12}$ is a specified deceleration value determined so that the subject vehicle does not collide with the preceding vehicle even when the preceding vehicle brakes hard. Here, $\alpha_{12}$ is established to be 0.5 G for example. FIG. 4 shows a relationship between the first safe inter-vehicle distance $L_{C1}$ ($L_{11}$ or $L_{12}$) established in the first safe inter-vehicle distance establishing section 15 and the second safe inter-vehicle distance $L_{C2}$ ($L_2$) established in the second safe inter-vehicle distance establishing section 18.

Further, in the second inter-vehicle distance comparing section 19, the second safe inter-vehicle distance $L_{C2}$ ($L_2$) established in the second safe inter-vehicle distance establishing section 18 is compared with the present inter-vehicle distance $L_S$ and when the present inter-vehicle distance $L_S$ becomes smaller than the second safe inter-vehicle distance $L_{C2}$, a signal is outputted to the second outputting section 20 and the traffic conditions judging section 14, respectively.

Then, in the second outputting section 20, based on the signal from the second inter-vehicle distance comparing section 19, a signal is outputted to the buzzer 7 so as to operate the buzzer 7 and at the same time to the brake control apparatus 8 so as to apply the brakes. Further, the signal is sent also to the traffic conditions judging section 14.

Figure 3:
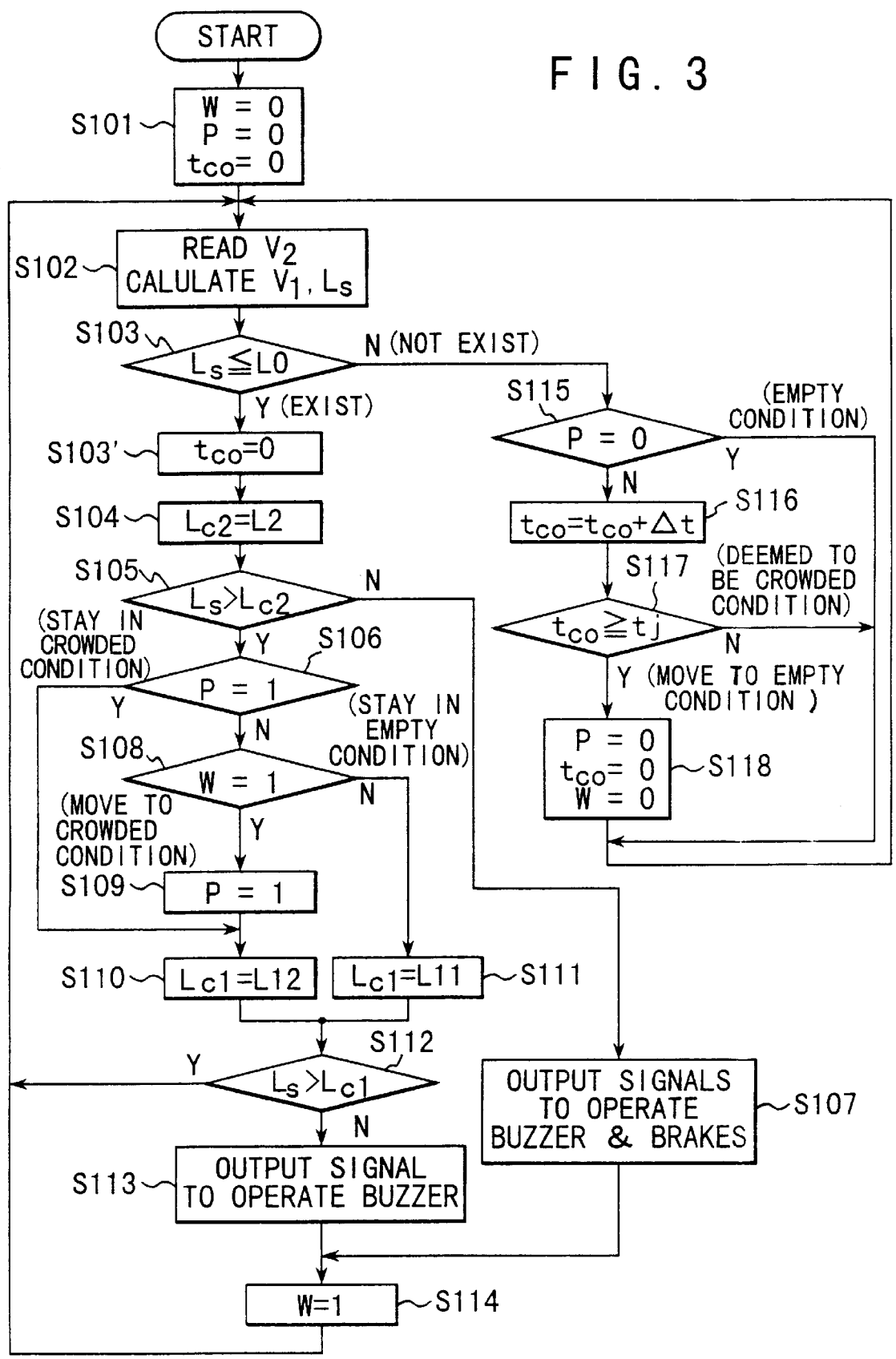
FIG. 3 is a flowchart showing a flow of control of a vehicular drive assist system according to the present invention.

Describing the control of the drive assist system thus constituted with reference to a flowchart shown in FIG. 3, at a step S101 (hereinafter, referred to as S number) a traffic conditions judging flag P, an assist output judging flag W and a timer count $t_{co}$ are cleared (P=0, W=0 and $t_{co}$=0), respectively. Then, at S102 a vehicle speed $V_2$ of the subject vehicle is read from the vehicle speed sensor 5 and an inter-vehicle distance $L_S$ and a preceding vehicle speed $V_1$ are calculated in the preceding vehicle information extracting section 11 and in the preceding vehicle speed calculating section 12, respectively.

The traffic conditions judging flag P is a flag for indicating whether the subject vehicle runs under the empty condition or the crowded condition. When running under the empty condition, the flag P is set to be "0" and when under the crowded condition, the flag is set to be "1". Further, the drive assist output judging flag W is a flag for indicating that either the first assist output or the second assist output has been outputted. When neither the first assist output nor the second assist output has been outputted, the flag W is set to be "0" and when either of them has been outputted, it is set to be "1". Further, the timer count $t_{co}$ indicates an accumulated time since the preceding vehicle goes out of the specified range (distance $L_0$).

Then, the program goes to S103 where it is judged whether or not the preceding vehicle exists within the specified range (distance $L_0$). That is to say, if the inter-vehicle distance $L_S$ is equal to or smaller than the specified range (distance $L_0$), it is judged that the preceding vehicle exists and then the program goes to S104 via S103'. If the inter-vehicle distance $L_S$ is larger than the specified range (distance $L_0$), it is judged that the preceding vehicle does not exist and then the program goes to S115. This processing at S103 is the one performed in the preceding vehicle existence judging section 13. At S103', the accumulated time $t_{co}$ is cleared because it is judged that the preceding vehicle exists.

When the program goes from S103 to S104 as a result of the judgment that the preceding vehicle exists, the second safe inter-vehicle distance $L_2$ is calculated according to the formula (3) in the second safe inter-vehicle distance establishing section 18 and set for the second inter-vehicle distance $L_{C2}$ which will be a reference value for the second assist output. Then, the program goes to S105 where the established second safe inter-vehicle distance $L_{C2}$ is compared with the present inter-vehicle distance $L_S$. If the inter-vehicle distance $L_S$ is larger than the second safe inter-vehicle distance $L_{C2}$ ($L_S > L_{C2}$), judging that the second assist is not needed, the program steps to S106 and if the inter-vehicle distance $L_S$ is equal to or smaller than the second safe inter-vehicle distance $L_{C2}$ ($L_S \leq L_{C2}$), judging that the second assist is needed, the program steps to S107 where the second outputting section 20 outputs a signal to the buzzer 7 and the brake control apparatus 8 so as to operate the buzzer and brakes, respectively. After that, the program goes to S114 where the assist output judging flag W is set to be 1 (W=1) and then returns to S102.

When it is judged at S105 that the second assist is not needed and the program goes to S106, it is judged whether or not the traffic conditions judging flag P is set. If the flag is set (P=1), it is judged that the crowded condition is held and the program skips to S110. If the flag is cleared (P=0), the program goes to S108 where it is judged whether or not the assist output judging flag W is set.

In a case where the assist output judging flag W is set (W=1) at S108, judging that the vehicle is running in the crowded condition, the program goes to S109 where the traffic conditions judging flag P is set (P=1) and then steps to S110. On the other hand, in a case where the assist output judging flag W is cleared (W=0), judging that the vehicle is in the empty condition, the program goes to S111.

When the program goes to S110 from S106 or S109, the first safe inter-vehicle distance $L_{12}$ at the crowded condition is calculated according to the formula (2) and the result of calculation is set to $L_{C1}$. When the program goes to S111 from S108, the first safe inter-vehicle distance $L_{11}$ at the empty condition is calculated according to the formula (1) and the result of calculation is set to $L_{C1}$.

After the first safe inter-vehicle distance $L_{C1}$ is set at S110 or S111, the program goes to S112 where this first safe inter-vehicle distance $L_{C1}$ is compared with the present inter-vehicle distance $L_S$. If the inter-vehicle distance $L_S$ is larger than the first safe inter-vehicle distance $L_{C1}$ ($L_S > L_{C1}$), judging that the inter-vehicle distance is kept appropriate, the program returns to S102 and if the inter-vehicle distance $L_S$ is equal to or smaller than the first safe inter-vehicle distance $L_{C1}$ ($L_S \leq L_{C1}$), judging that the first assist for calling a driver's attention is needed, the program goes to S113 where the buzzer 7 is operated. Then, the program goes to S114 wherein the assist output judging flag W is set to be 1 (W=1) and returns to S102.

On the other hand, when it is judged at S103 that the preceding vehicle does not exist, the program goes to S115 where it is judged whether or not the traffic conditions judging flag P is cleared. If the traffic conditions judging flag P is cleared (P=0), judging that the vehicle is in the empty condition, the program returns to S102 and if the traffic conditions judging flag P is set (P=1), the program goes to S116 wherein the timer count $t_{co}$ is counted up by $\Delta t$.

Then, at S117 it is judged whether or not the timer count $t_{co}$ exceeds a specified time $t_j$. If the timer count $t_{co}$ does not reach the specified time $t_j$ ($t_{co} < t_j$), the vehicle is deemed to be still in the jam condition and the program returns to S102. If the timer count $t_{co}$ becomes equal or larger than the specified time $t_j$ ($t_{co} \geq t_j$), it is judged that the vehicle is transferred to the empty condition and the program returns to S102 after clearing all flags and the timer count $t_{co}$ (P=0, W=0 and $t_{co}$ =0) respectively at S118.

Processes from S106 to S109 and from S115 to S118 correspond to ones performed in the traffic conditions judging section 14. Those processes include operating just the buzzer or operating both the buzzer and brakes when the inter-vehicle distance becomes smaller than the specified distance value which is variable according to the traffic conditions. Further, once the buzzer is operated, it is judged that the traffic condition is deemed as the crowded condition while the preceding vehicle exists within the specified range (distance $L_0$) or until the specified time $t_j$ elapses after the preceding vehicle goes out of that specified range.

The preferred embodiment is constituted so that the first assist output is an output for operating a buzzer and the second assist output is an output for operating both the buzzer and brake control apparatus, however it may be constituted only by the first assist output, namely, only the output for operating buzzer.

Further, the buzzer may be replaced with other means such as a warning light or an oral warning.

Furthermore, the second assist output according to the embodiment of the present invention is constituted so as to output to both the buzzer and brake control apparatus. However this output may be directed only to the buzzer or only to the brake control apparatus.

In summary, according to the present invention, in the drive assist system constituted such that the buzzer is operated to warn the vehicle driver to pay attention to the preceding vehicle when the inter-vehicle distance becomes smaller than a safe inter-vehicle distance, this safe inter-vehicle distance is calculated and automatically established according to the traffic conditions, either empty or crowded. Due to this variable safe inter-vehicle distance, when the road is crowded, frequent operations annoying the vehicle driver with the buzzer can prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A drive assist system for a vehicle, comprising:

traffic conditions judging means for judging a traffic condition for said vehicle;

first safe inter-vehicle distance establishing means for establishing a first safe inter-vehicle distance according to said judged traffic condition;

first inter-vehicle distance comparing means for comparing a calculated inter-vehicle distance between the vehicle and a preceding vehicle with said first safe inter-vehicle distance and for outputting a first signal when said calculated inter-vehicle distance becomes smaller than said first safe inter-vehicle distance;

second safe inter-vehicle distance establishing means for establishing a second safe inter-vehicle distance smaller than said first safe inter-vehicle distance; and second inter-vehicle distance comparing means for comparing said calculated inter-vehicle distance with said second safe inter-vehicle distance and for outputting a second signal when said calculated inter-vehicle distance becomes smaller than said second safe inter-vehicle distance.

2. The drive assist system according to claim 3, wherein said crowded condition is defined as a condition during a time period in which said preceding vehicle exists within a specified range of distance after said first signal or second signal is output and in which said preceding vehicle is out of said specified range of distance but within a specified time after said first signal or second signal is output.

3. The drive assist system according to claim 1, wherein said traffic conditions judging means judges between at least a crowded condition and an empty condition.

4. The drive assist system according to claim 3, wherein said first safe inter-vehicle distance is established to be relatively short when said traffic condition is judged to be said crowded condition and said first safe inter-vehicle distance is established to be relatively long when said traffic condition is judged to be said empty condition.

5. The drive assist system according to claim 1, further including inter-vehicle distance calculating means for detecting a preceding vehicle running ahead of said vehicle and for calculating said inter-vehicle distance between said vehicle and said preceding vehicle.

6. The drive assist system according to claim 1, further including preceding vehicle speed calculating means for calculating a vehicle speed of said preceding vehicle based on said calculated inter-vehicle distance and said vehicle speed of said vehicle.

7. The drive assist system according to claim 1, wherein said first signal is employed to activate a warning device, and the second signal is employed to activate a braking system for said vehicle.

8. The drive assist system according to claim 7, wherein said first signal is employed to activate an audible warning device.

9. The drive assist system according to claim 7, wherein said second signal is employed to activate a warning device.

10. The drive assist system according to claim 9, wherein said second signal is employed to activate an audible warning device.

11. The drive assist system according to claim 1, wherein the second safe inter-vehicle distance is established irrespective of said judged traffic condition.

* * * * *